United States Patent [19]

Fröhlich et al.

[11] Patent Number: 4,897,038
[45] Date of Patent: Jan. 30, 1990

[54] CARTOGRAPHIC DEVICE

[76] Inventors: Ingrid Fröhlich; Andreas Pachler, both of Aufhofen 8, D-8195 Egling, Fed. Rep. of Germany

[21] Appl. No.: 113,818

[22] PCT Filed: Feb. 3, 1987

[86] PCT No.: PCT/DE87/00041
§ 371 Date: Oct. 2, 1987
§ 102(e) Date: Oct. 2, 1987

[87] PCT Pub. No.: WO87/04834
PCT Pub. Date: Aug. 13, 1987

[30] Foreign Application Priority Data

Feb. 3, 1986 [EP] European Pat. Off. ........ 86101373.8
Sep. 29, 1986 [DE] Fed. Rep. of Germany ....... 3633051

[51] Int. Cl.$^4$ .................... G09B 29/10; G09B 27/08
[52] U.S. Cl. ................................. 434/153; 434/131; 434/145; 434/146
[58] Field of Search .............. 434/131, 130, 132, 133, 434/135, 136, 141, 142, 145–147, 149, 150, 153, 111, 430; 364/400, 424; 340/286 N, 709, 755, 810; 40/429–432, 541, 568, 885, 904

[56] References Cited

U.S. PATENT DOCUMENTS 3,096,593  7/1963  Visser ................................ 434/146
4,532,514  7/1985  Hatano et al. ..................... 364/424

FOREIGN PATENT DOCUMENTS 2514180  4/1983  France ............................. 434/430

OTHER PUBLICATIONS

Collins, IBM Technical Disclosure Bulletin, "Optical Display Device", 3/1962.

Primary Examiner—Leo P. Picard
Assistant Examiner—Jessica J. Harrison
Attorney, Agent, or Firm—Dellett, Smith-Hill and Bedell

[57] ABSTRACT

A cartographic device consists in particular of a globe inside which is placed a driving and controlling mechanism able to move a point radiator (42) along the inner wall of the globe in such a way that a point of light visible from the outside and movable at will in the horizontal and vertical directions indicates the geographical location of a place the name of which has been entered in the computer arranged in the base of the globe. The device is controlled by a permanently programmed micro-computer connected to the stepping motors (31, 41) of the mechanism.

14 Claims, 8 Drawing Sheets

CARTOGRAPHIC DEVICE

The invention relates to a cartographic device.

BACKGROUND OF THE INVENTION

A cartographic device is known from DE-OS 26 46 534 with which a mark is moved across a map spread out flat so as to indicate a location. The mark is formed by the intersection of two crossing wires clamped between threaded nuts which in turn are longitudinally displaceable by threaded rods supported at opposite edges of the map casing. The threaded rods are rotated by stepping motors which are pulse controlled. It is not specified how this pulse control might be realized. The adjustment of the mark by way of threaded rods is inconvenient with the known map device as they permit only rather slow adjusting movements. The structural expenditure becomes quite large because the design of the mark in the form of two crossing wires requires four threaded rods including four stepping motors.

Another cartographic device, namely an illuminated globe is known from DE-AS 23 37 640. This luminous globe comprises a point radiator in its inside to generate a light spot on the wall of the globe. The point radiator is pivotable about an axis in the equatorial plane by a mechanical device to be actuated from outside the globe. Adjustment of the pivot position of the point radiator and rotation of the globe can move the light spot to a desired geographic location, scale rings permitting the light spot to be moved to the respective place on the globe, starting from the known latitudinal and longitudinal coordinates of a geographic location. Such a place indicator, however, is not very efficient because pivoting of the point radiator and rotating of the globe by means of the graduated rings based on the coordinate values read from a table for a location which is looked for, hardly can be accomplished more quickly than the direct search of the place on the globe surface by means of these coordinate values. The adjusting mechanism of the point radiator works with a string drive means having a somewhat complicated guidance of the string so as to avoid slip in the transmission of movement. And yet slip is inevitable and readjustment of the scale ring is required from time to time.

It is the object of the invention to provide a cartographic device by means of which a desired geographic place can be found quickly and reliably.

SUMMARY OF THE INVENTION

The cartographic device according to the invention comprises a microcomputer in which the local parameters are stored of a great number of geographic places. In the case of a road map, for instance, such local parameters are street names, sights, theaters or movie theaters, and the like, in the case of a globe they are towns, lakes, rivers, mountains, and the like. The input of the geographic place looked for into the microcomputer conveniently is done by typing in the name of the respective geographic place on an input keyboard. If programmed accordingly, it may be possible that only a certain number of letters of the respective geographic name must be typed in as are needed for unambiguous identification. It is likewise feasible to accept an input as sufficient if some individual letters are erroneous, provided the remaining correct letters suffice for precise identification. Such programs, as well as the structure of the microcomputer are conventional and need not be explained in any greater detail here.

On receipt of an input the microcomputer, for example, controls stepping motors of a drive and control mechanism by pulses in correspondence with the memorized local parameters belonging to the input so as to lead a place indicator, like a light spot to the desired geographic location.

It would be possible to return the place indicator to its starting, reference, or zero position prior to each new input and to move from the same to the geographic place in accordance with the new input. However, a more elegant and quicker solution is one including a calculator unit associated with the microcomputer to allow for the local parameters of the starting point of the place indicator in reactivating the drive and control mechanism. In other words, the local parameters of the starting point of the place indicator are subtracted from the local parameters of the newly input geographic place so that a number of pulses decreased or increased accordingly will be applied to the stepping motors.

If the transmission of movement inside the drive and control mechanism from the stepping motors to the place indicator is not effected by means of meshing power transmitting members in form lock, but instead by power transmitting members which are subject to slipping but preferred because of their lower structural expenditure, such as string drives, friction wheels and the like, deviations are inevitable between the theoretical and actual positions of the place indicator after a certain number of courses of movement. In accordance with an advantageous further development of the invention, therefore, a correcting means is associated with the cartographic device, embodied by at least one fixed reference point on the map for position finding or position checking of the place indicator. Such a reference point, for instance, may be the starting or zero point mentioned of the place indicator, to which point the place indicator returns automatically upon switch-off or renewed switch-on of the device. It is likewise possible to have one or more reference points distributed on the map within the range of movement of carrier members of the place indicator such that one or more of the reference points will be reached occasionally during normal use of the device.

The reference points, for example, are electrical or optical contactors having associated local parameters which are permanently stored in the microcomputer. When a reference point is reached, the calculator unit, having compared these permanently stored local parameters with the local parameters of the place indicator computed at this time, calculates the required number of corrective pulses which then are applied to the stepping motors.

BRIEF DESCRIPTION OF THE DRAWINGS

Embodiments of the invention will be described further with reference to the accompanying drawings, in which.

DETAILED DESCRIPTION

Figure 1:
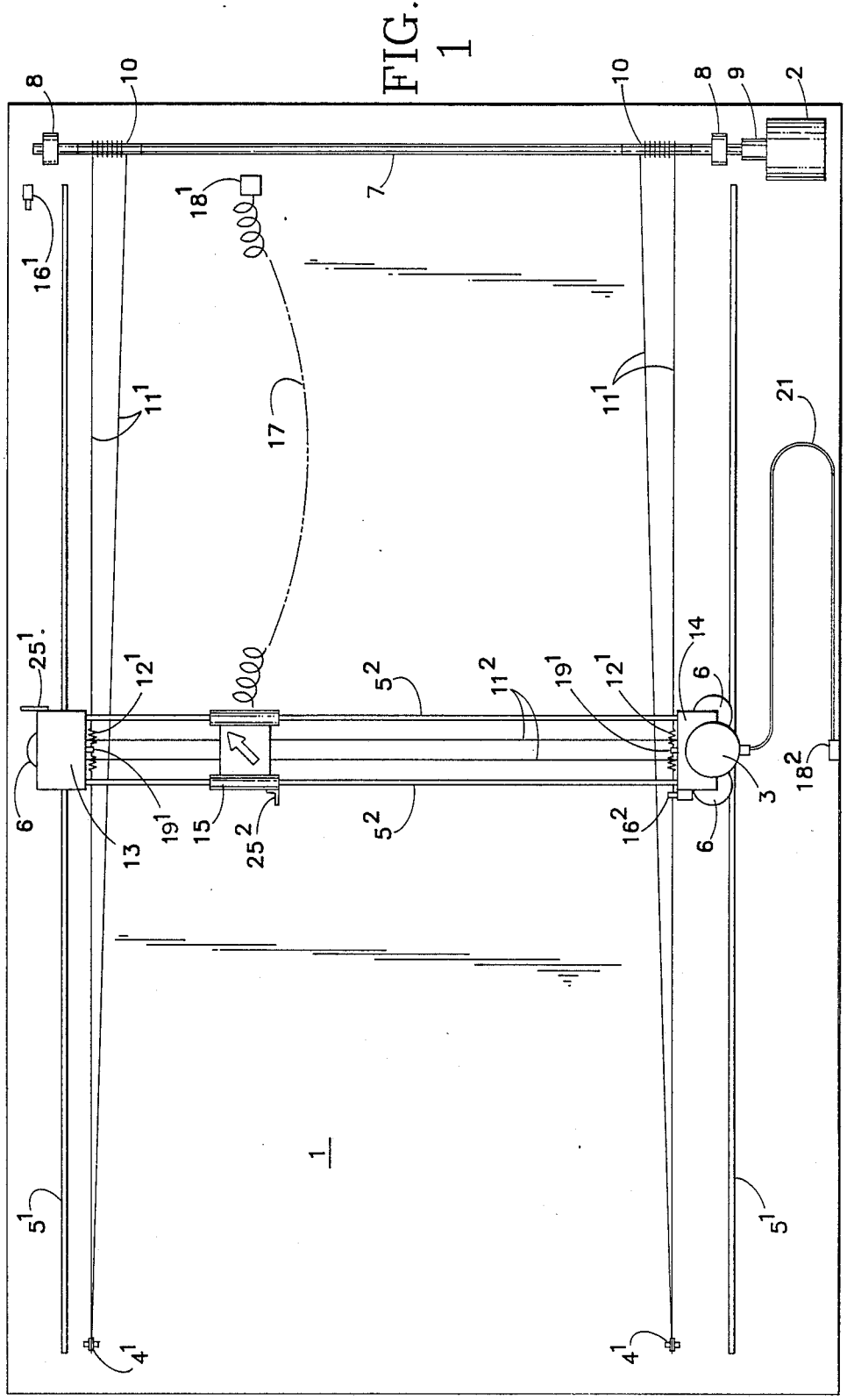
FIG. 1 is a front elevation of a cartographic device with a map spread out flat on the top side of a housing frame.
Figure 2:
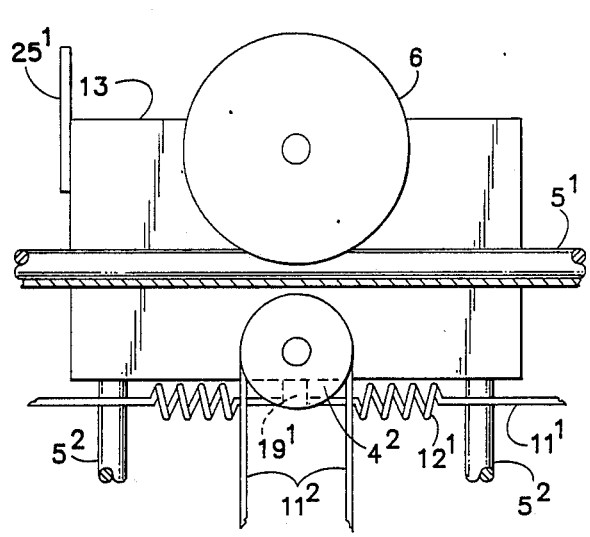
FIGS. 2 and 3 are a rear elevation and a side elevation, respectively, of a detail of the upper horizontal slide of the cartographic device shown in FIG. 1.
Figure 3:
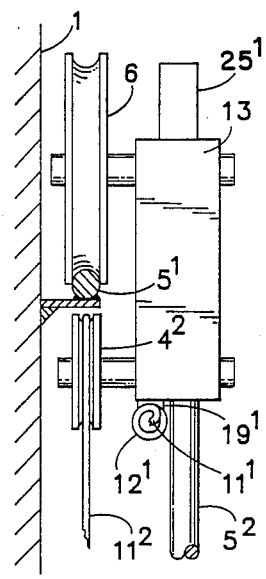
Figure 4:
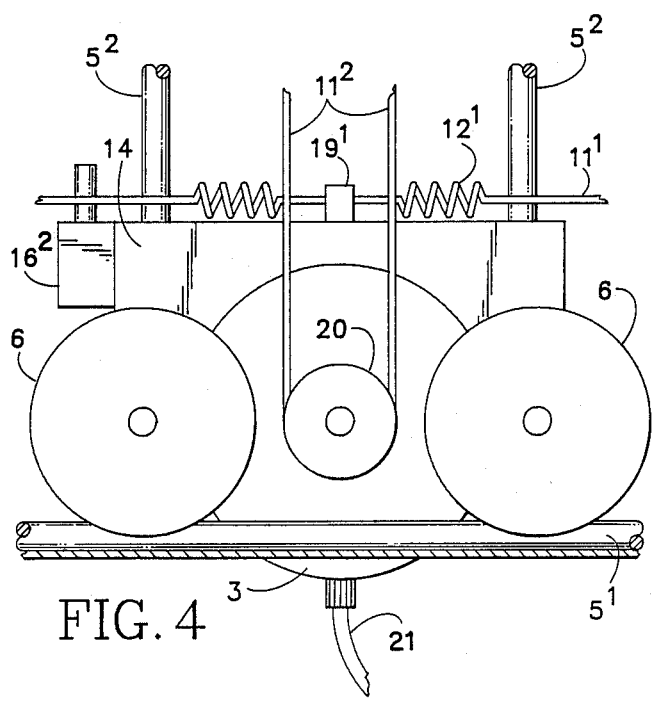
FIGS. 4 and 5 are a rear elevation and a side elevation, respectively, of a detail of the lower horizontal slide of the cartographic device shown in FIG. 1.
Figure 5:
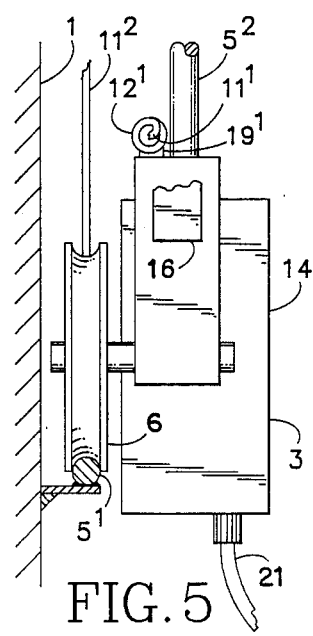
Figure 6:
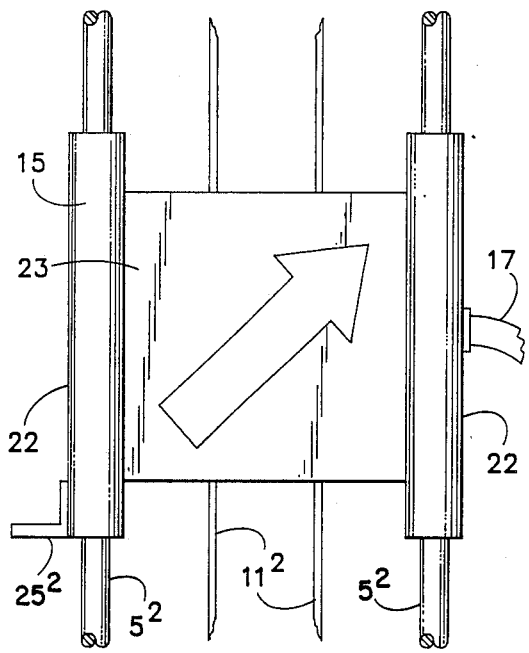
FIGS. 6 and 7 are a front elevation and a side elevation, respectively, of a detail of the vertical slide of the cartographic device shown in FIG. 1.
Figure 7:
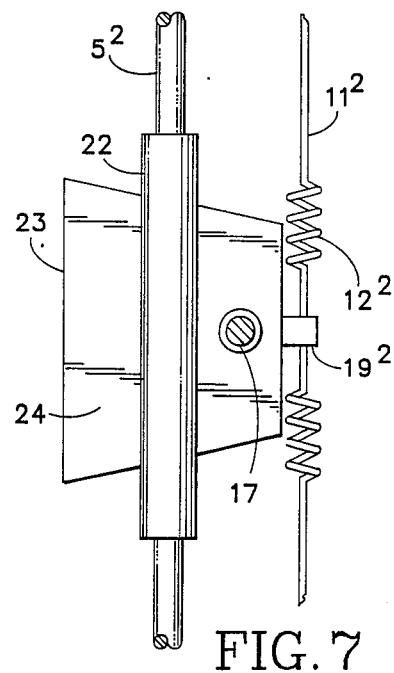

The cartographic device shown in FIG. 1 comprises a rectangular housing frame 1 on the transparent top side of which (removed from the drawing) a map is spread out flat. Preferably the cartographic device is placed in an upright position, for example suspended on a wall.

Upper and lower horizontal rails $5^1$ are arranged in the housing frame 1, and an upper horizontal slide 13 and a lower horizontal slide 14 interconnected by rails $5^2$ are supported on those rails for horizontal displacement by means of rollers 6 which are supported for easy movement. One roller 6 supported in the upper horizontal slide 13 and two rollers 6 in the lower horizontal slide 14 provide stable three-point bearing. The upper and lower horizontal slides 13 and 14 are attached to string drive means by way of fastening points $19^1$ and tension springs $12^1$, the drive means comprising not only strings $11^1$ but also a vertical drive shaft 7 at the right side of the housing frame 1 and return pulleys $4^1$ at the left side of the housing frame. The strings $11^1$ are wrapped in a plurality of windings around the drive shaft 7 so as to provide substantially slip-free power transmission from the drive shaft 7 to the strings $11^1$. For the same purpose of obtaining substantially slip-free power transmission the strings $11^1$ used are braided plastic cords e.g. of polyamide, and the travelling zones 10 are roughened on which the windings move as the slides 13 and 14 are displaced horizontally. The drive shaft 7 which is supported for easy movement in ball bearings 8 is driven by a first stepping motor 2 via a clutch 9.

A vertical slide 15 likewise driven by a string drive moves along the rails 5 which interconnect the upper and lower horizontal slides 13 and 14. Apart from strings $11^2$ which again are attached by tension springs $12^2$ to fastening points $19^2$ of the vertical slide, this string drive means comprises a return pulley $4^2$ at the upper horizontal slide 13 and a drive wheel 20, mounted on the driven shaft of a second stepping motor 3, at the lower horizontal slide 14.

Fitted between two sliding sleeves 22 which are displaceable on the vertical rails $5^2$ the vertical slide 15 comprises a lamp casing 24 with an arrow diaphragm 23 on its top side. A lamp is mounted inside the lamp casing 24 and connected to an external power source by a helix cable 17 and cable fixture $18^1$.

Sensors or microswitches $16^1, 16^2$ arranged, on the one hand, at the housing frame 1 at the end of movement of the horizontal slides 13 and 14 and, on the other hand, at the lower horizontal slide 14 at the end of movement of the vertical slide 15 cooperate with flags $25^1, 25^2$ at the horizontal and vertical slides, respectively, to determine zero coordinate points.

The second stepping motor 3 mounted on the lower horizontal slide 14 and microswitch $16^2$ are connected by helix cable 21 and a cable fixture $18^2$ to the computer (not shown in FIG. 1). The first stepping motor 2 likewise is connected to the computer.

Figure 8:
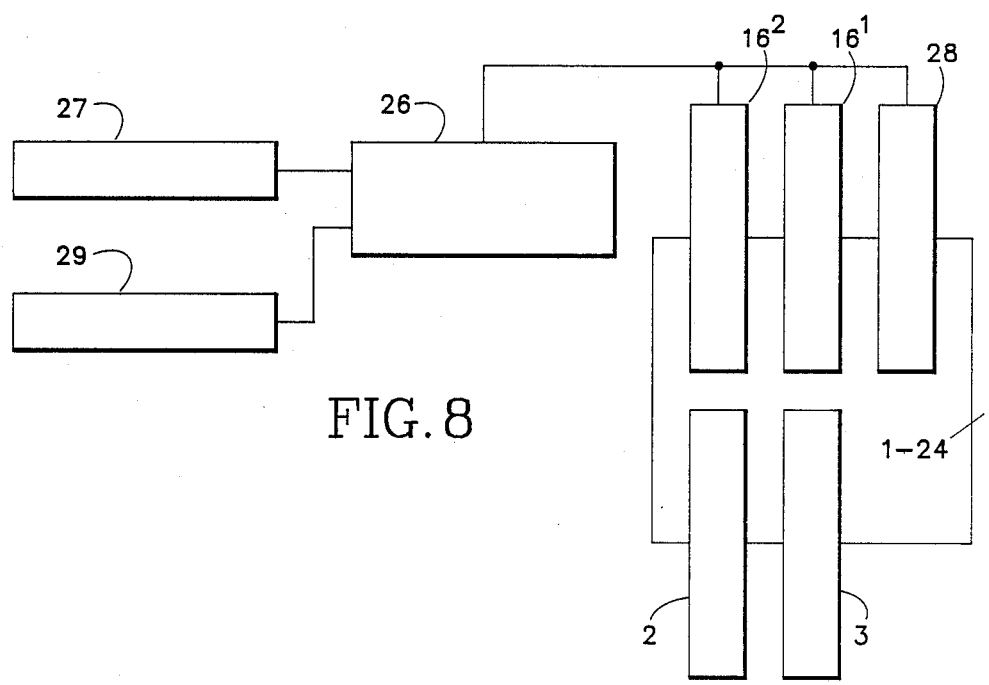
FIG. 8 is a control diagram for the cartographic device shown in FIG. 1.

The circuit diagram of the cartographic device described is illustrated in FIG. 8. Thus the computer 26 including a memory and calculator unit is connected, on the one hand, to the input keyboard 27 and, on the other hand, to the stepping motors 2 and 3 and the sensors $16^1$ and $16^2$. As shown in FIG. 8, another sensor 28 is provided which may be located, for example, at a median position of the horizontal slides 13 and 14. A speaker 29 connected to the computer 26 furnishes an acoustic indication, for example, of key pressure actuation, cancellation, inability to find the term.

The cartographic device described operates as follows:

upon switch-on of the device, slides 13, 14, and 15 move to zero/zero position by scanning sensors $16^1$, $16^2$;

input of the geographic term into the input keyboard;

searching for the local coordinates memorized in the computer of the geographic term which was put in;

calculating the kind and number of pulses for application to stepping motors 2 and 3;

controlling stepping motors 2 and 3.

Slip correction:

When that part of the drive and control mechanism which is liable to slip passes a certain median position, sensor 28 responds. This is recorded by the computer and any deviation of the local coordinates determined by the computer at this time from said median position leads to the forming of a correction value which is applied to the respective stepping motor.

Figure 9:
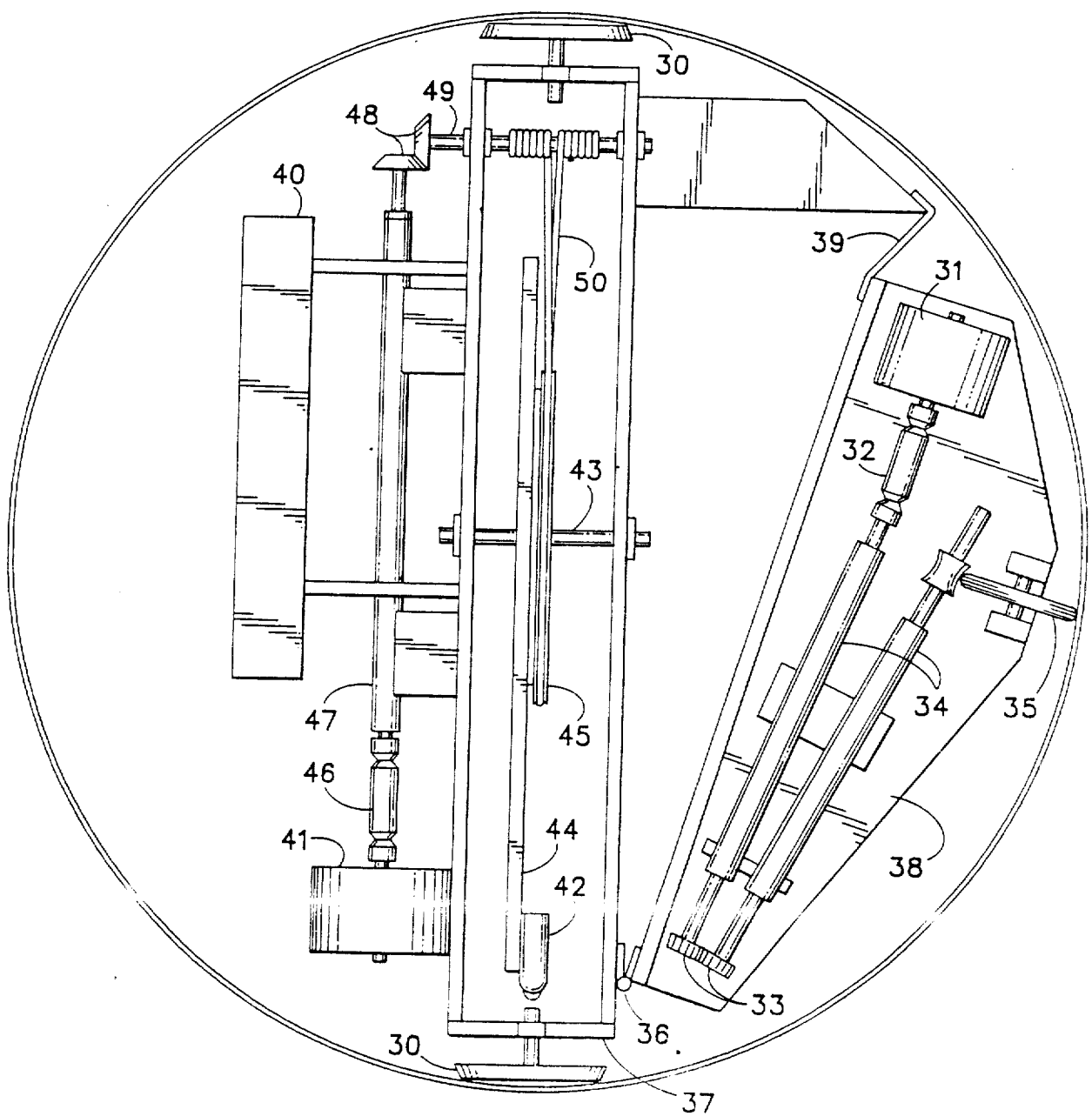
FIGS. 9 and 10 are side elevations rotated through 90° of a drive and control mechanism mounted in a globe.
Figure 10:
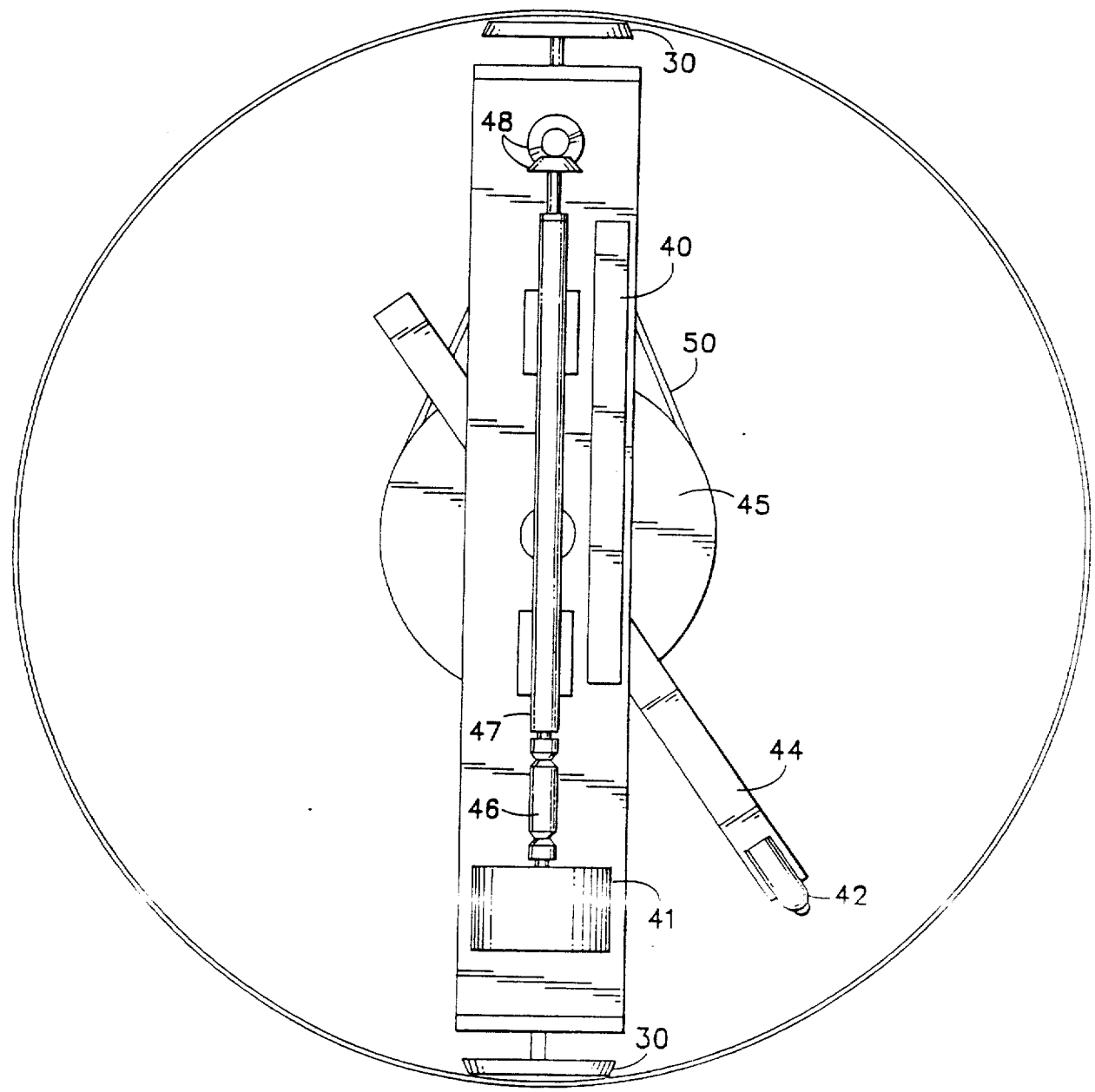

FIGS. 9 and 10 show one possible structure of a drive and control mechanism to be arranged inside a globe. The mechanism is supported for rotation about fastening members 30 bonded to the inside wall of the globe (not shown) on any desired globe diameter. Conveniently, the places of bonding are so selected that they will not cover any geographic locations memorized in the computer.

One of two stepping motors 31 is responsible for rotation of the mechanism about the fastening members 30. To this end the stepping motor 31 drives a rubberized drive wheel 35 supported for easy motion by means of a universal coupling 32 and two shafts 34 connected to gears 33. Good contact between the drive wheel 35 and the inside wall of the globe at all times is warranted since the entire assembly is mounted on a lateral plate 38 connected by a hinge 36 to the carrier member 37 and is pressed against the inside wall of the globe by an elastic drawstring 39. Movement of the drive wheel 35 thus causes the entire mechanism inside the globe to be rotated. A counterweight 40 is mounted at the opposite side to counteract the uneven weight distribution.

A second stepping motor 41 takes care of the rotation of the point radiator 42 about an axis 43 extending substantially perpendicular to the first axis of rotation determined by the fastening members 30. The point radiator 42 is attached to an elongated rod 44 mounted on the rotatable axis 43 together with a drive wheel 45. Rotation is imparted to this assembly of drive wheel, rod, and point radiator by the stepping motor 41 being connected by a universal coupling 46 to a shaft 47 which in turn drives a drive shaft 49 supported in the carrier member 37 via a miter gearing composed of bevel gears 48. Connection between the drive shaft 49 and the drive wheel 45 is established by a string 50 which may be fixed, on the one hand, punctiformly at the drive wheel 45 and, on the other hand, by both its ends on the drive shaft 49 as the maximum movement required of the point radiator 42 is pivoting through 180°. The transmission of movement is substantially free of slip.

The point radiator 42 can produce a light spot at any desired location on the globe by pulse control of the stepping motors 31 and 41. The pulse control is effected in the same manner as described above with reference to the cartographic device shown in FIGS. 1 to 8. Of course, in feeding the computer with the geographic places, the selected location at which the fastening members 30 are attached must be taken into consideration. Constant position finding and slip correction during operation are rendered possible by sensors whose local parameters are permanently stored in the computer and which are disposed at the inside wall of the globe.

In the case of the embodiment described, the rotational and pivotal movements were carried out by the drive and control mechanism itself. This has the advantage that the globe can be turned from outside as usual, for example, about a north-south axis without affecting the drive and control mechanism. Naturally, the globe can be turned only to the extent permitted by the current supply for the stepping motors and the point radiator, said current supply being realized through the south pole bearing of the globe.

Another embodiment can be realized with the drive and control mechanism described if the carrier member 37 is arranged to be stationary on the north-south axis of the globe. In this event, rather than the drive and control mechanism, the globe itself is rotated by the drive wheel 35. This embodiment has the advantage of easier power supply of the stepping motors and point radiator.

Figure 11:
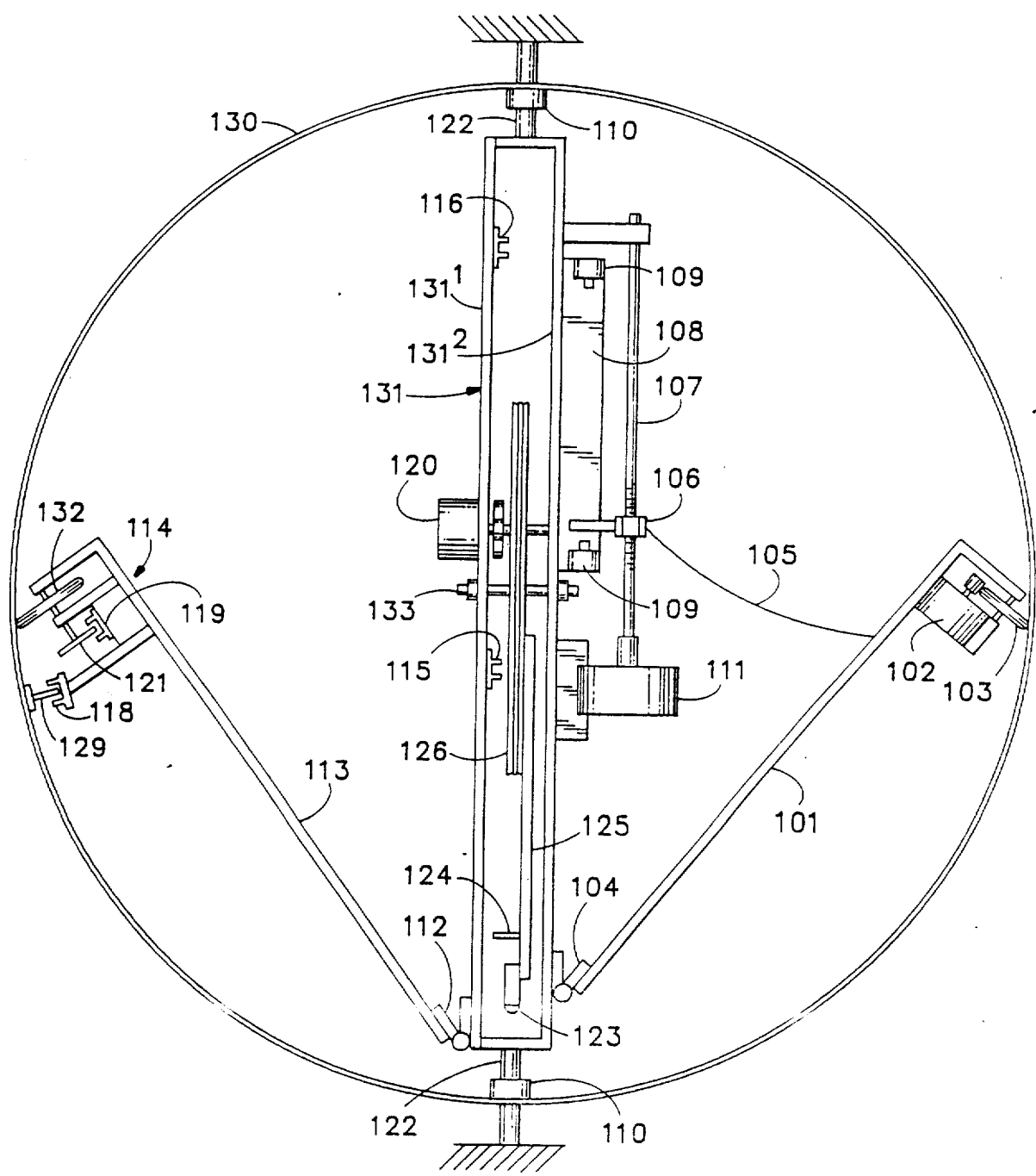
FIGS. 11 to 13 are side elevations, each rotated through 90° with respect to one another of another drive and control mechanism mounted in a globe.
Figure 12:
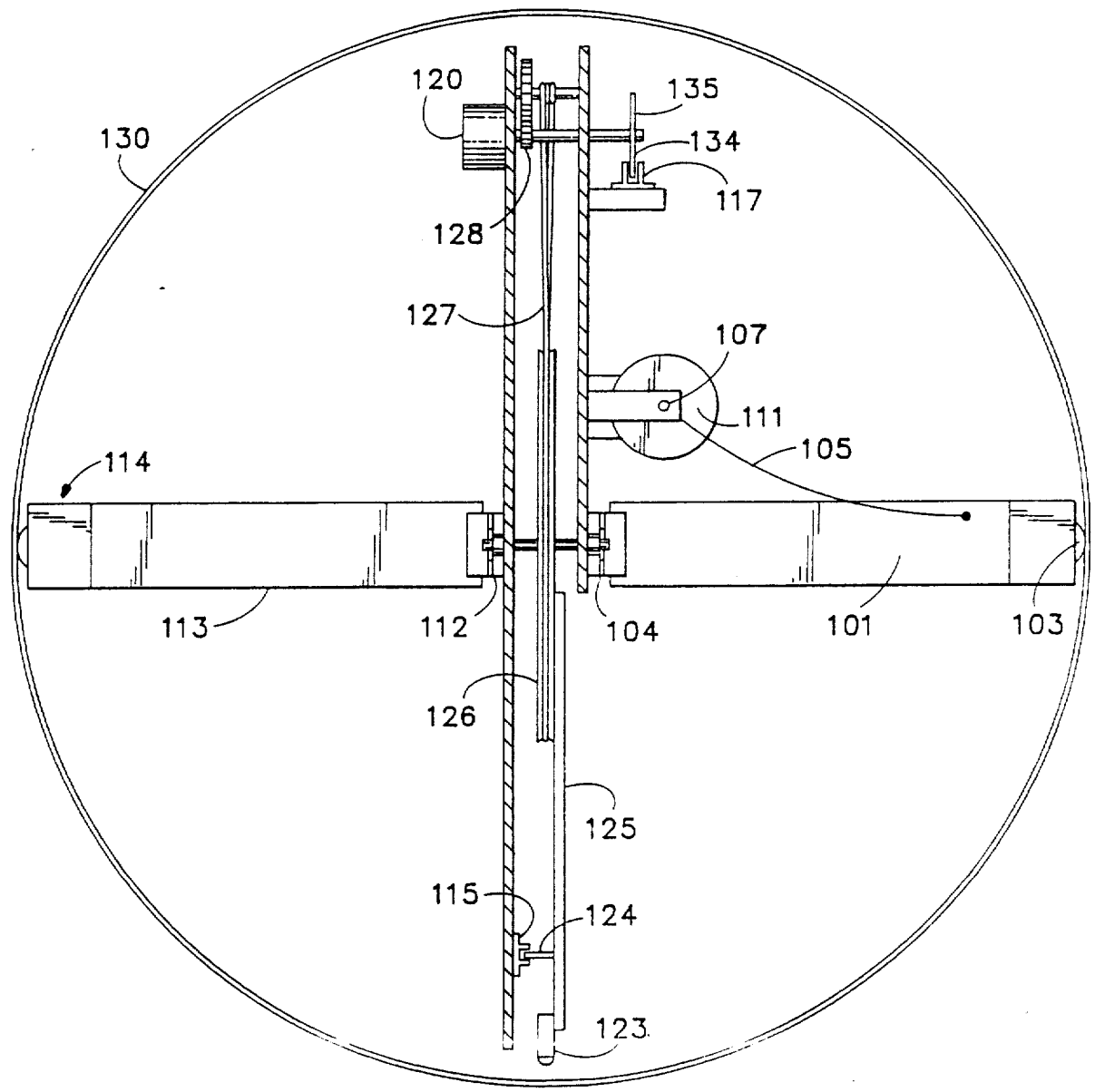
Figure 13:
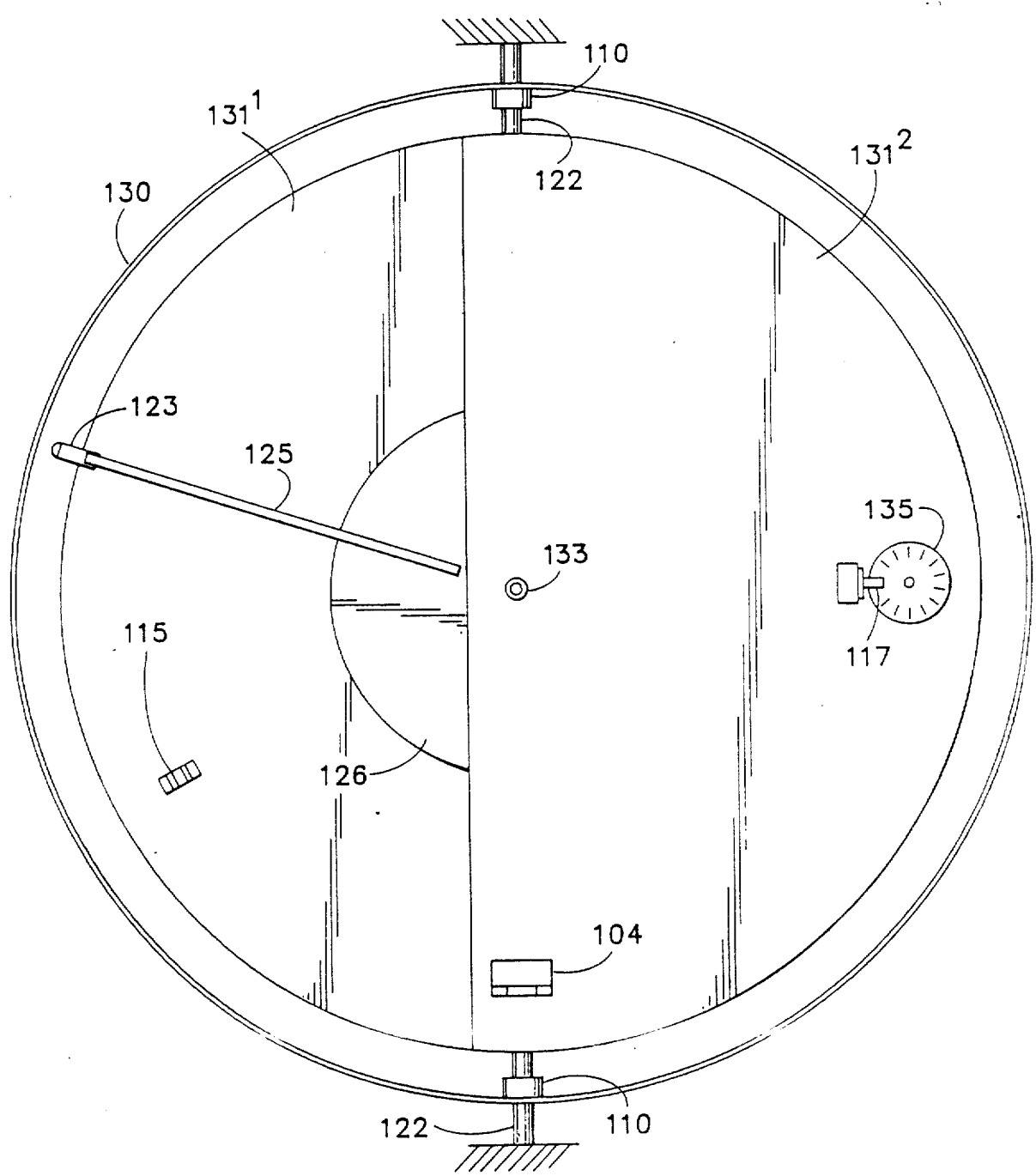

A third embodiment of a drive and control mechanism for installation in a globe is illustrated in FIGS. 11 to 13. This embodiment is especially well suited in those cases in which the globe is to remain freely rotatable if the "automatic search" is not applied.

The mechanism comprises a carrier member 131 embodied by a rear carrier full disc $131^1$ and, spaced from the same, a front carrier semi disc $131^2$. Journal pins 122 projecting from the circumference of the carrier member 131 at diametrically opposed sides constitute a north-south axis about which the globe 130 is supported for easy rotation in ball bearings 110.

An arm 101 including a drive motor 102 and a rubberized drive wheel 103 at its free end is pivotably connected at its lower end to the carrier semi disc $131^2$ by a hinge 104. The natural weight of the arm 101 and the weight of the drive motor 102 cause the drive wheel 103 to lie against the inside wall of the globe so that the drive wheel 103 will turn the globe 130 when the drive motor 102 is set into operation. Other than the stepping motor of the preceding embodiments, the drive motor 102 is a synchronous 220 V motor, for example, of little structural volume and to be operated without a transformer. A step-down gear may be associated in the usual manner with the drive motor 102.

The counting function of the stepping motors of the preceding embodiments is taken over in this case by a separate counter 114 arranged at the free end of a second arm 113 which is pivotably connected at its lower end to the carrier full disc $131^1$ by a hinge 112. The counter 114 comprises an easily rotatable, rubberized wheel 132 abutting against the inside wall of the globe under the natural weight of the arm 113 and the counter 114, thus being taken along in rotation by the revolving globe 130. The rotation of wheel 132 is transferred by a transmission to a recording disc 121 whose rotation in turn is scanned by a bifurcated light barrier 119.

Between the carrier discs $131^1$ and $131^2$ a disc 126 is supported for rotation about an axis 133 which is substantially perpendicular to the north-south axis. The point radiator 123 on a rod 125 is fixed to this disc. For vertical shifting of the point radiator 123, the disc 126 is driven by the drive motor 120 which is connected by a step-down gear 128 and a drive belt 127 to the disc 126. What has been stated with respect to the drive motor 102 applies also to drive motor 120. The distance covered by the point radiator 123 is detected like the rotary motion of the globe by means of a counter 134 with a recording disc 135 which is mounted directly on the driven shaft of the motor 120 and scanned by a bifurcated light barrier 117.

The mode of operation of the drive and control mechanism described corresponds to that of the mechanism shown in FIGS. 9 and 10, except that the counting function serving to detect the distances covered is not carried out by stepping motors but by separate counters 114, 134. In addition to the advantage of this embodiment not requiring any expensive stepping motors, it should be mentioned that there is hardly any incidence of slipping as the rotational masses are small between the globe 130 and the wheel 132 of the counter 114, a circumstance contributing to the accuracy of the "automatic search".

Position finding including slip correction are possible at all times during operation because again sensors are mounted on the inside wall of the globe, as described before, and their local parameters are permanently stored in the computer. One such sensor, as shown in FIG. 11, is a metal pin 129 arranged at the inside wall of the globe and cooperating with a bifurcated light barrier 118 on arm 113. The metal pin 129 also may fix a starting position of the globe 130 by having the drive motor 102 turn the globe, upon switch-on or switch-off of the device, until the metal pin 129 is moved through the light barrier 118. Slip correction may be effected or a starting position be moved to in similar manner by bifurcated light barriers 115 and 116 mounted on the carrier member 131 and cooperating with a metal pin 124 at the carrier rod 125 of the point radiator 123. The point radiator 123 is shown in different pivot positions in FIGS. 11 to 13.

As shown in FIGS. 11 and 12, a means is provided to lift the drive wheel 103 off the inside wall of the globe so that it will be possible to turn the globe freely and easily when the "automatic search" is not applied. This means comprises a drive motor 111 arranged on the carrier member 131 and rotating a threaded rod 107. A threaded nut 106 secured against rotation by a guide bar 108 is movable up and down on the threaded rod 107. The nut 106 is connected to the arm 101 by a drawstring 105 whereby the arm is pulled up when the nut 106 moves in upward direction. Microswitches 109 fix the lower and upper end positions of the threaded nut 106.

WHAT IS CLAIMED IS:
1. A cartographic device comprising:
support means for supporting a map on which a plurality of locations are illustrated at respective positions,
a place indicator that is movable relative to the support means for indicating locations on the map, at least one fixed reference element on the support means for defining the position of the place indicator, input means for receiving information relating to a location illustrated on the map, a microcomputer having permanently stored therein information defining the positions on the map at which selected locations are illustrated, and drive means responsive to the microcomputer to move the place indicator to the position at which a location is illustrated.

2. A cartographic device according to claim 1, wherein the input means comprise a keyboard for typing in the name of a location illustrated on the map.

3. A cartographic device according to claim 1, wherein the microcomputer comprises a calculator unit for taking account of the position of the place indicator when the drive means are activated.

4. A cartographic device according to claim 1, wherein the place indicator is returned automatically to the position of the reference element when the device is reset.

5. A cartographic device according to claim 1, wherein the drive means comprise at least one carrier member for supporting the place indicator, and the reference element is within the range of movement of the carrier member so that the reference element is reached by the carrier member during normal use of the device.

6. A cartographic device according to claim 1, wherein the reference element comprises a contact sensor.

7. A cartographic device according to claim 1, wherein the drive means comprise at least one stepping motor and means responsive to the microcomputer for application of pulses to the stepping motor.

8. A cartographic device according to claim 1, comprising at least one counter which is connected to the drive means to detect the distance moved by the place indicator in response to the drive means.

9. A cartographic device according to claim 1, wherein the support means define a planar surface for receiving a flat map, and wherein the device comprises a first slide which is movable relative to the support means in a first direction, a second slide which is movable relative to the first slide in a second direction substantially perpendicular to the first direction, and wherein the place indicator is mounted on the second slide.

10. A cartographic device according to claim 9, wherein the drive means comprise at least one drive motor, a rotatable drive member coupled to the drive motor, and string drive means coupling the rotatable drive member to at least one of the slides.

11. A cartographic device according to claim 1, wherein the support means define a hollow globe having a spherical exterior surface and a spherical interior surface and a carrier member that extends along a diameter of the globe, the drive means comprise a drive wheel supported by the carrier member and urged resiliently against the interior surface of the globe, the drive wheel describing a circular path about the interior of the globe when the drive wheel is driven, and the place indicator comprises a point radiator positioned inside the globe and supported on the carrier member for rotation in a plane substantially perpendicular to the plane of said circular path.

12. A cartographic device according to claim 11, wherein the globe is supported for rotation about the diameter on which the carrier member extends.

13. A cartographic device according to claim 12, comprising means for disengaging the drive wheel from the interior surface of the globe.

14. A cartographic device according to claim 11, comprising bearings attached to the interior surface of the globe, the carrier member being mounted in the bearings for rotation.

* * * * *

UNITED STATES PATENT AND TRADEMARK OFFICE
CERTIFICATE OF CORRECTION

PATENT NO. : 4,897,038

DATED : January 30, 1990

INVENTOR(S) : Ingrid Fröhlich; Andreas Pachler

It is certified that error appears in the above-identified patent and that said Letters Patent is hereby corrected as shown below:

FIGS. 9 through 13 should appear as shown on the attached drawing sheets.

Signed and Sealed this

Twenty-sixth Day of November, 1991

Attest:

HARRY F. MANBECK, JR.

*Attesting Officer*        *Commissioner of Patents and Trademarks*